United States Patent [19]
Dai

[11] Patent Number: 6,081,598
[45] Date of Patent: Jun. 27, 2000

[54] CRYPTOGRAPHIC SYSTEM AND METHOD WITH FAST DECRYPTION

[75] Inventor: Wei Dai, Bellevue, Wash.

[73] Assignee: Microsoft Corporation, Redmond, Wash.

[21] Appl. No.: 08/953,911

[22] Filed: Oct. 20, 1997

[51] Int. Cl.$^7$ ................ H04L 9/28; H04L 9/30; H04L 9/08

[52] U.S. Cl. ................ 380/28; 380/30; 380/44; 380/21

[58] Field of Search .................. 380/28, 30, 44, 380/21

[56] References Cited

U.S. PATENT DOCUMENTS

| | | | |
|---|---|---|---|
| 5,323,464 | 6/1994 | Elander et al. | 380/24 |
| 5,483,598 | 1/1996 | Kaufman et al. | 380/43 |
| 5,600,725 | 2/1997 | Reuppel et al. | 380/30 |
| 5,761,310 | 6/1998 | Naciri | 380/30 |

OTHER PUBLICATIONS

Bellare et al. "Optimal Asymmetric Encryption", Eurocrypt '94 Proceedings Lecture Notes in Computer Science, vol. 950 Springer Verlag (1994) pp. 92–111.

Menezes et al. "Handbook of applied Cryptography" CRC Press 1996 pp. 285–298 (see p. 287 note 8.5 and p. 297).

*Primary Examiner*—Pinchus M. Laufer
*Attorney, Agent, or Firm*—Lee & Hayes, PLLC

[57] ABSTRACT

A cryptography system improves the decryption speed in the RSA algorithm by taking advantage of certain subgroups of $Z_n^*$. The cryptography system employs a new family of trapdoor permutations based on exponentiation in subgroups of $Z_n^*$.

33 Claims, 3 Drawing Sheets

CRYPTOGRAPHIC SYSTEM AND METHOD WITH FAST DECRYPTION

TECHNICAL FIELD

This invention relates to cryptographic systems, computers, and computer-implemented methods for performing encryption and decryption operations. More particularly, this invention relates to a cryptographic system that improves the speed at which decryption operations are performed.

BACKGROUND

Public key cryptography is a widely used approach for securely transmitting messages over an otherwise unsecured communications channel. Public-key cryptography employs asymmetric key pairs. An "asymmetric" cryptographic key pair consists of two separate keys, a first key to manipulate data in one way and a second key to convert the manipulated data back to its original form. The keys are based upon a mathematical relationship in which one key cannot be calculated (at least in any reasonable amount of time) from the other key.

Cryptographic key pairs can be used for different functions, such as encryption, decryption, digital signing, signature verification, and authentication. As an example, encryption and decryption using an asymmetric key pair can be represented as follows:

$$E_{Kpub}(M) = C$$
$$D_{Kpri}(C) = M$$

where "$E_{Kpub}$" is an encryption function using a public encryption key "Kpub" to encrypt a plaintext message "M" into ciphertext "C", and "$D_{Kpri}$" is a decryption function using a private decryption key "Kpri". The inverse is also true in that a message can be "signed" using the private key and the signature can be verified using the public key.

In a public key system, the public key is distributed to other parties and the private key is maintained in confidence. The asymmetric public and private keys ensure two results. First, only the holder of the private key can decrypt a message that is encrypted with the corresponding public key. Second, if another party decrypts a message using the public key, that party can be assured that the message was encrypted by the private key and thus originated with presumably the holder of the private key.

One of the best known and most widely used asymmetric ciphers is the RSA cryptographic cipher named for its creators Rivest, Shamir, and Adleman. The original RSA cryptography system is described in U.S. Pat. No. 4,405,829, entitled "Cryptographic Communications System and Method", which issued Sep. 20, 1983, in the names of Rivest, Shamir, and Adleman. This patent is incorporated by reference as background information.

The RSA cipher for encryption and decryption is given as follows:

RSA Encryption: $C = M^e \bmod n$

RSA Decryption: $M = C^{1/e \bmod (p_1-1)(p_2-1)} \bmod n$ where $p_1$ and $p_2$ are prime numbers, n is a composite number of the form $n = p_1 p_2$, and e is a number relatively prime to $(p_1-1)(p_2-1)$.

The operation "mod" is a "modular reduction" operation, or simply "modulo" operation, which is a common operation for large integer arithmetic. The modulo operation is an arithmetic operation whose result is the remainder of a division operation. It is expressed as "A mod B," where A is a number written in some base and B is the "modulus." The result of A mod B is the remainder of the number A divided by the modulus B. As a simple example, the modulo operation 17 mod 3 yields a result of 2, because 17 divided by 3 yields a remainder of 2. Because it produces a remainder, the modulo operation is often alternately referred to as the "division remainder" operation.

With the conventional RSA cryptography, decryption is significantly slower than encryption. This discrepancy is due to the fact that the RSA cipher requires more computations to decrypt a message than are needed to encrypt the same message. The discrepancy can be disadvantageous in certain environments. For example, in the client server context, clients and servers often exchange encrypted messages to one another. Individual clients often enjoy plentiful time and resources to encrypt a message. Unfortunately, the server does not experience such luxury and may on occasions be limited in its ability to rapidly decrypt incoming messages, especially during times of high client request volume.

Accordingly, there is a need to improve the speed of the decryption in the RSA algorithm.

SUMMARY

This invention concerns a cryptography system and method that improves the decryption speed in the RSA cipher. The cryptography system employs a new family of trapdoor permutations based on exponentiation in subgroups of $Z_n^*$.

The system includes an encoder to transform a message M into ciphertext C and transmit the ciphertext C over a communications channel. The ciphertext C has two components, a value V and a value W. The value V is a function of a number x, or $V = x^e$, where e is an integer and x is as follows:

$x = g^R \bmod n$, where:
  (i) n is a number $n = p_1 p_2$ where $p_1$ and $p_2$ are prime numbers with $p_1 = r_1 q_1 + 1$ and $p_2 = r_2 q_2 + 1$, where $r_1$ and $r_2$ are random numbers, and $q_1$ and $q_2$ are prime numbers;
  (ii) R is a random number selected independent of the random numbers $r_1$ and $r_2$; and
  (iii) g is a number in the form of $g = r_3^{(p_1-1)(p_2-1)/q_1 q_2} \bmod n$, where $r_3$ is a random number selected independent of the random numbers $r_1$, $r_2$, and R.

The value W is encoded as a function of a value $h_1(x)$ and the message M (e.g., $h_1(x) \oplus M$), where value $h_1(x)$ is a one-way function of a number x (e.g., a hash function of x).

The encoder also computes a hash value $h_2(x, M)$ using a hashing function h of the number x and the message M. The encoder sends the ciphertext C (including values V and W) and the hash value $h_2(x, M)$ over the communications channel.

The system further includes a decoder coupled to receive the ciphertext C and the hash value $h_2(x, M)$ from the communications channel and to transform the ciphertext C back to the message M. The decoder first derives the number x from the value V, as follows $x = V^{(1/e) \bmod q_1 q_2} \bmod n$. The decoder then decodes the message M using a function of the value W and the value $h_1(x)$ (e.g., $W \oplus h_1(x)$). After recovering the message M, the decoder computes a test hash value $h_2'(x, M)$ from the number x and the recovered message M and compares the test hash value $h_2'(x, M)$ from the hash value $h_2(x, M)$ received from the encoder. If the two hash values match, the message M has not been altered.

DETAILED DESCRIPTION

The following discussion assumes that the reader is familiar with cryptography techniques and modulo operations. For a basic introduction of cryptography, the reader is directed to a text written by Bruce Schneier and entitled, "Applied Cryptography: Protocols, Algorithms, and Source Code in C," second edition, published by John Wiley & Sons with copyright 1996, which is hereby incorporated by reference.

Figure 1:
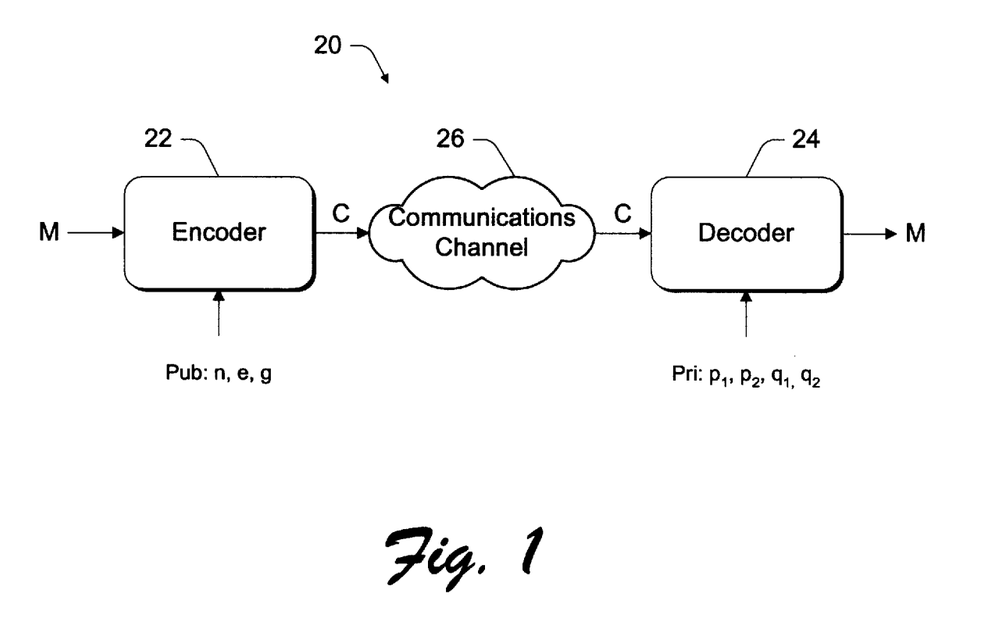
FIG. 1 is a block diagram of a cryptography system.

FIG. 1 shows a cryptographic system 20 having an encoder 22 coupled to a decoder 24 via a communications channel 26. The cryptographic system 20 is employs an asymmetric cryptographic cipher that is based on the RSA algorithm. More particularly, the preferred system is a Bellare-Rogaway cryptosystem that employs the RSA trapdoor permutation family.

In general, the cryptographic cipher employs a private key consisting of four prime numbers $p_1$, $p_2$, $q_1$, and $q_2$. The prime numbers are related as follows:

$$p_1 = r_1 q_1 + 1$$

$$p_2 = r_2 q_2 + 1$$

where $r_1$ and $r_2$ are random numbers, constrained by a requirement that their value in the above equations yield prime numbers $p_1$ and $p_2$.

A public key is generated from the private key. The public key consists of three numbers n, e, and g. The number e is an integer, and numbers n and g are computed as follows:

$$n = p_1 p_2$$

$$g = r_3^{(p_1-1)(p_2-1)/q_1 q_2} \mod n$$

where $r_3$ is a random number that is selected independent of the random numbers $r_1$ and $r_2$. The random number $r_3$ will most likely be different from the random numbers $r_1$ and $r_2$, although it need not be. The number g is a random element of $Z_n^*$ of order $q_1 q_2$.

The encoder 22 encodes a message M into a ciphertext C using the public key, which consists of n, e, and g. Broadly speaking, the ciphertext C is a function of the message M and a number x, where x has an order $q_1 q_2$ in $Z_n^*$. The number x is derived as follows:

$$x = g^R \mod n$$

where R is a random number that is selected independent of the random numbers $r_1$ and $r_2$. The random number R will most likely be different from the random numbers $r_1$ and $r_2$, although it need not be. The ciphertext C has two components, a value V and a value W. The value V is a function of the number x, as follows:

$$V = x^e$$

The value W is a function of a value $h_1(x)$ and the message M, where the value $h_1(x)$ is a result of a one-way function $h_1$ of the number x. As one example, the one-way function is implemented as a hash function, such as SHA (Secured Hash Algorithm). In one implementation, the value W is computed using an exclusive OR function, as follows:

$$W = h_1(x) \oplus M$$ However, other logical combinations of the value $h_1(x)$ and M may be used in place of the exclusive OR function, as long as the logical operation is reversible.

The encoder 22 packages the values V and W together to form the ciphertext C, and sends it across the communications channel 26 to the decoder 24. The decoder 24 recomputes the number x from the value V using the private key, which consists of the public key plus $p_1$, $p_2$, $q_1$, $q_2$, as follows:

$$x = V^{(1/e) \mod q_1 q_2} \mod n.$$

Once the number x is recovered, the decoder 24 recaptures the message M from the value W as follows:

$$M = W \oplus h(x) = h(x) \oplus M \oplus h(x) = M$$

The cryptographic cipher described above and utilized in system 20 is advantageous in that the decrypting speed is faster as compared to decryption in the standard RSA cipher. The reason for this is that the operation "$V^{(1/e) \mod q_1 q_2} \mod n$" used in the recovery of x is significantly faster than a corresponding operation "$C^{(1/e) \mod (p_1-1)(p_2-1)} \mod n$" used in the traditional RSA cipher.

The improved decryption speed is achieved by employing a new family of trapdoor permutations based on exponentiation in subgroups of $Z_n^*$. The above cryptography cipher takes advantage of a certain subgroup of $Z_n^*$. More particularly, the cipher utilizes subgroups of $Z_n^*$, which are generated by g, to compute the number x. This enables computations on the decryption side that are of order $q_1 q_2$ in $Z_n^*$.

The cryptographic cipher has a disadvantage in that the encryption process is slower in comparison to encryption in the standard RSA algorithm. This is because the new scheme involves added computations to derive the number x on the encryption side. The number of added computations can be minimized by computing the number x only occasionally, rather than every time. This optimization is discussed below in more detail.

Overall, the cryptographic cipher is approximately equal in speed with the RSA cipher. However, in some contexts, it is beneficial to improve the speed of the decryption process, even if the improvement comes at the cost of slower encryption. In the client-server context, for example, improving decryption speed at the server is a real benefit, even if it comes at the expense of slower encryption at the client. The client has abundant time to encrypt messages and the slower speed should not be noticeable; yet, any improvement in decryption speed at the server would be appreciated.

The FIG. 1 architecture is representative of many different environments in which cryptographic capabilities are used. For instance, in the client-server context, an encoder 22 and decoder 24 might be implemented at both the client and server to enable secure communications over a network, such as a LAN (local area network), a WAN (wide area network), or the Internet. As another example, in a smart card context, the encoder 22 might be implemented in the smart card and the decoder 24 might be implemented in a communicating agent (e.g., computer, ATM, kiosk, vending machine, custom machine, etc.). Here, the channel 26 represents an electronic interface between the card and the agent.

For purposes of continuing discussion, the cryptographic system 20 will be described as being implemented in general purpose computers, such as personal computers, servers, workstations, laptops, and so forth.

Figure 2:
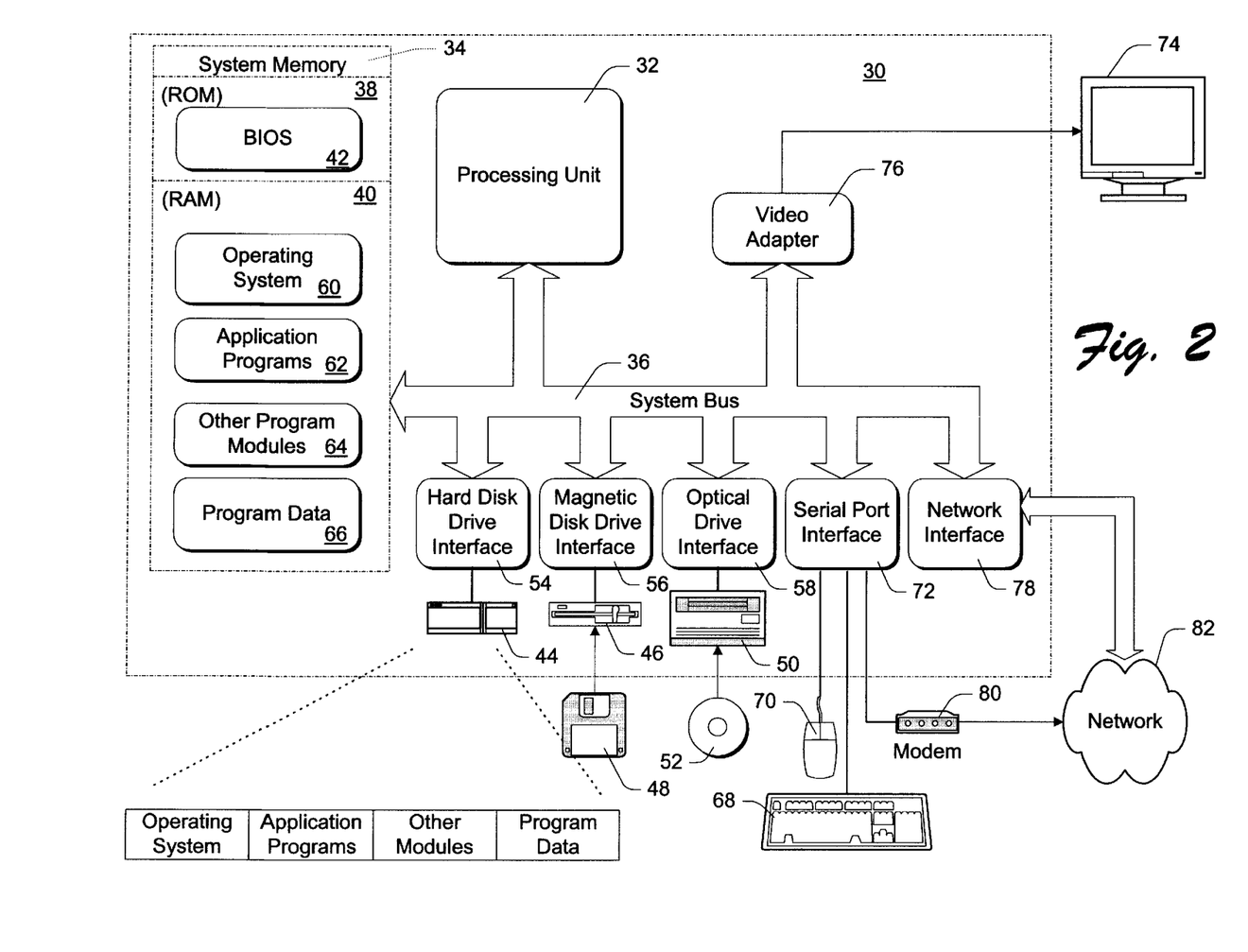
FIG. 2 is a block diagram of a computer system that implements the cryptography system.

FIG. 2 shows an example implementation of a general purpose computer 30. The computer 30 includes a processing unit 32, a system memory 34, and a system bus 36 that couples various system components including the system memory 34 to the processing unit 32. The system bus 36 may be any of several types of bus structures including a memory bus or memory controller, a peripheral bus, and a local bus using any of a variety of bus architectures. The system memory 34 includes read only memory (ROM) 38 and random access memory (RAM) 40. A basic input/output system 42 (BIOS) is stored in ROM 38.

The computer 30 also has one or more of the following drives: a hard disk drive 44 for reading from and writing to a hard disk, a magnetic disk drive 46 for reading from or writing to a removable magnetic disk 48, and an optical disk drive 50 for reading from or writing to a removable optical disk 52 such as a CD ROM or other optical media. The hard disk drive 44, magnetic disk drive 46, and optical disk drive 50 are connected to the system bus 36 by a hard disk drive interface 54, a magnetic disk drive interface 56, and an optical drive interface 58, respectively. The drives and their associated computer-readable media provide nonvolatile storage of computer readable instructions, data structures, program modules and other data for the personal computer 30.

Although a hard disk, a removable magnetic disk 48, and a removable optical disk 52 are described, it should be appreciated by those skilled in the art that other types of computer readable media can be used to store data. Other such media include magnetic cassettes, flash memory cards, digital video disks, Bernoulli cartridges, random access memories (RAMs), read only memories (ROM), and the like.

A number of program modules may be stored on the hard disk, magnetic disk 48, optical disk 52, ROM 38, or RAM 40. These programs include an operating system 60, one or more application programs 62, other program modules 64, and program data 66.

A user may enter commands and information into the personal computer 30 through input devices such as a keyboard 68 and a mouse 70. Other input devices (not shown) may include a microphone, joystick, game pad, satellite dish, scanner, or the like. These and other input devices are often connected to the processing unit 32 through a serial port interface 72 that is coupled to the system bus 36, but may be connected by other interfaces, such as a parallel port, game port, or a universal serial bus (USB).

A monitor 74 or other type of display device is also connected to the system bus 36 via an interface, such as a video adapter 76. In addition to the monitor, personal computers typically include other peripheral output devices (not shown) such as speakers and printers.

The server computer 30 has a network interface or adapter 78, a modem 80, or other means for establishing communications over a network 82 (e.g., LAN, Internet, etc.). The modem 80, which may be internal or external, is connected to the system bus 36 via the serial port interface 72.

The cryptographic system 20 may be implemented in the computer 30 as software, firmware, or hardware. For instance, the encoder 22 and decoder 24 may be implemented within the operating system 60, application programs 62, or program modules 64 (such as a DLL—dynamic linked library). Alternatively, the encoder 22 and decoder 24 may be implemented in ROM 38. In yet another embodiment, the encoder 22 and decoder 24 may be implemented within the processing unit 32.

Figure 3:
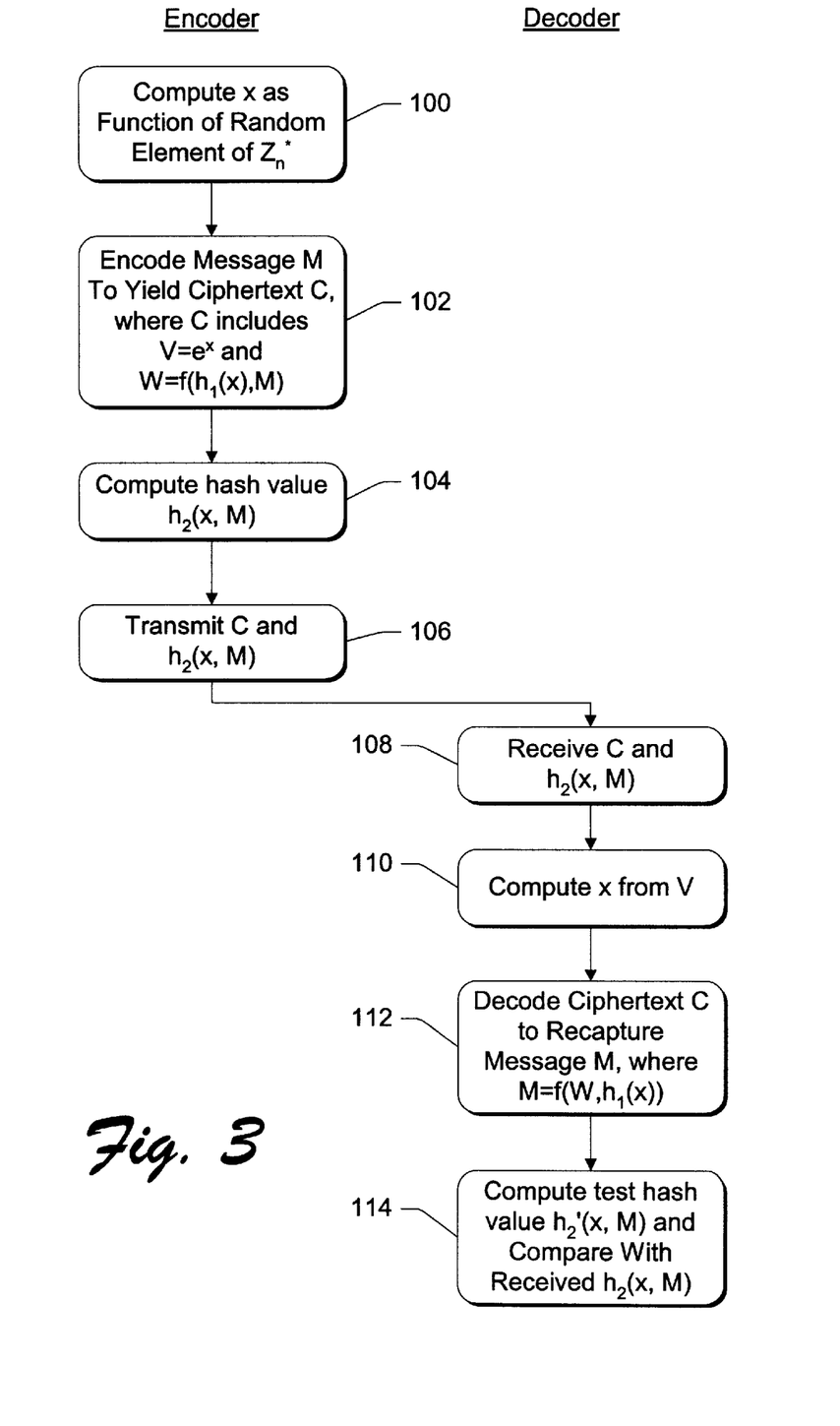
FIG. 3 is a flow diagram showing steps in a method for encrypting and decrypting a message.

FIG. 3 shows exemplary steps in a method for encrypting and decrypting messages using the cryptographic system 20. As pictorially represented in FIG. 3, steps 100–106 are performed by the encoder 22 and steps 108–114 are performed by the decoder 24. The encoder 22 knows the public key (i.e., prime numbers n, e, and g) that is derived from the private key. These keys may be stored in memory or registers. The decoder 24 knows the private key (i.e., numbers $p_1$, $p_2$, $q_1$, and $q_2$).

At step 100, the encoder 22 computes the number x as a function of g, a random element of $Z_n^*$ of order $q_1 q_2$. More particularly, the encoder 22 calculates x as follows:

$$x = g^R \bmod n$$

where R is a random number.

At step 102, the encoder encodes the message M to yield a ciphertext C. This encoding involves generating the values V and W, where $V = x^e$ and $W = h_1(x) \oplus M$. The value $h_1(x)$ is a result of a first hash function $h_1$ of the number x. The ciphertext C consists of the values V and W.

At step 104, the encoder 22 computes another hash value $h_2(x, M)$, which is a result of a second hash function $h_2$ of the number x and the message M. The decoder 24 uses this hash value to check whether the message M has been altered or otherwise compromised in route between the encoder and decoder. At step 106, the encoder 22 transmits the ciphertext C (i.e., $V = x^e$ and $W = h_1(x) \oplus M$) and second hash value $h_2(x, M)$ over the communications channel 26 to the decoder 24.

At step 108, the decoder 24 receives the ciphertext C and second hash value $h_2(x, M)$. At step 110, the decoder 24 then recomputes the number x from the value V component (i.e., $V = x^e$) of the ciphertext C, as follows:

$$x = V^{(1/e) \bmod q_1 q_2} \bmod n.$$

Once the number x is recovered, the decoder 24 computes the hash value $h_1(x)$ using the same first hash function $h_1$ employed by the encoder 22. At step 112, the decoder 24 recovers the message M from the value W component of the ciphertext C, as follows:

$$M = W \oplus h_1(x)$$

At step 114, the decoder 24 takes the recovered number x and the recovered message M and computes a test hash value $h_2'(x, M)$ using the same second hash function $h_2$ employed by the encoder. If the test hash value $h_2'(x, M)$ equals the hash value $h_2(x, M)$ received from the encoder 22, the decoder 24 is assured that the message M has not been altered.

The above encryption/decryption process can be represented in the following pseudo-code. The key calculation can be performed once, prior to the encryption/decryption steps to establish the key values. The keys can be updated as needed.

Key Calculation int e, $r_1$, $r_2$, $r_3$ prime int $p_1$, $p_2$, $q_1$, $q_2$ $p_1 \leftarrow r_1 q_1 + 1$ $p_2 \leftarrow r_2 q_2 + 1$ $n \leftarrow p_1 p_2$ $g \leftarrow r_3^{(p_1 - 1)(p_2 - 1)/q_1 q_2} \bmod n$ Encryption Function E(M, V, W, HV) \*M is an input parameter*\

\*V, W, and HV are output parameters*\ int R

$x \leftarrow g^R \bmod n$

$V \leftarrow x^e \bmod n$

$W \leftarrow h_1(x) \oplus M$

$HV \leftarrow h_2(x, M)$ return V, W, HV

Decryption

Function D(V, W, HV, M) \*V, W, and HV are input parameters*\

\*M is the output parameter*\

$x \leftarrow V^{(1/e) \bmod q_1 q_2} \bmod n.$

$M \leftarrow W \oplus h_1(x)$ $HV_{test}=h_2(x, M)$

Compare $HV_{test}=HV$ return M

In one implementation, the integer "e" is set to two, so that the new family of trapdoor permutations is based on squaring in subgroups of $Z_n^*$.

One of the drawbacks of the cryptography scheme is that the encryption process is slower than traditional RSA encryption because the encoder computes the number x as a function of g, a random element of $Z_n^*$. Deriving the number x requires additional computations not present in the traditional RSA encryption.

One way to improve the speed of the encryption phase is to compute the number x once and then use the old number x to generate a new number x for the next encryption. In particularly, the improvement involves changing the number x for each new encryption in a manner that is less computationally intensive than recomputing $g^R$ mod n for each new encryption. One approach to generating a new number x from the old number x is as follows:

$x \leftarrow x^{k\ exp(i)}$, where "k exp(i)" is expressed as $k^i$.

The encoder computes the number x (i.e., $x=g^R$ mod n) and stores the number x in memory or a register for subsequent use. For each subsequent encryption, the encoder changes x by computing $x^{k\ exp(i)}$, and choosing a value "i" such that the value V remains the same when x is changed. The encoder then sends the value i along with the value V to the decoder for use in recovering the value x.

This process of amortizing the value x over several encryptions reduces the number of computations during each encoding procedure. The cryptography system preserves forward-secrecy for the encoder so that if the number x is leaked, past messages are not compromised, but future messages may be compromised. The encoder may fully recompute the number x at any interval or at any time it deems necessary.

The above cryptography system can also be used to improve decryption speed in batch RSA, a well-known variation of RSA. The cryptography system is similar to that described above, but differs in that the random numbers $r_1$ and $r_2$ used to derive prime numbers $p_1$ and $p_2$ are further constrained to not be divisible by the first b primes, where b is the decryption batch size.

For the batch RSA, the number x is still derived as follows:

$x=g^R$ mod n

The value V is then calculated as follows:

$V=x^e$ mod n where $e=(i+1)$-th odd prime and i is from $Z_b$

On the decryption side, the value x is recovered as:

$x=V^{(1/e)\ mod\ q_1 q_2}$ mod n

The above modification to batch RSA enables quicker decryption because during the batch inverse operation, the exponents can be reduced modulo $q_1 q_2$.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

I claim:

1. In a system for sending messages over a network between first and second computing units, a method comprising the following steps:

(a) encrypting a message M into ciphertext C at the first computing unit, where the ciphertext C includes a value V and a value W, as follows:

(1) the value V is a function of a number x, $V=x^e$, where e is an integer and x is as follows:

$x=g^R$ mod n, where:

(i) n is a number $n=p_1 p_2$ where $p_1$ and p2 are prime numbers with $p_1=r_1\ q_1+1$ and $p_2=r_2\ q_2+1$, where $r_1$ and $r_2$ are random numbers, and $q_1$ and $q_2$ are prime numbers;

(ii) R is a random number selected independent of the random numbers $r_1$ and $r_2$; and (iii) g is a number in the form of $g=r_3^{(p_1-1)(p_2-1)/(q_1 q_2)}$ mod n, where $r_3$ is a random number selected independent of the random numbers $r_1$, $r_2$, and R;

(2) the value W is a function of a value h(x) and the message M, the value h(x) being a result of a one-way function of the number x;

(b) sending the ciphertext C from the first computing unit to the second computing unit; and (c) decrypting the ciphertext C at the second computing unit to reproduce the message M, where M is a function of the value W and the value h(x) and x is derived as $x=V^{(1/e)\ mod\ q_1 q_2}$ mod n.

2. The method of claim 1, the encrypting step comprising the step of deriving the value W as $W=h(x)\oplus M$.

3. The method of claim 2, the decrypting step comprising the step of deriving the message M as $M=W\oplus h(x)$.

4. The method of claim 1, the integer e equaling 2.

5. The method of claim 1:

the encrypting step comprising the step of computing a hash value h(x, M) from a hash function h of the number x and the message M;

the sending step comprising the step of sending the hash value h(x, M) along with the ciphertext C from the first computing unit to the second computing unit; and the decrypting step comprising the steps of computing a test hash value h'(x, M) from the hash function h of the derived number x and the reproduced message M and comparing the hash value h(x, M) received from the first computing unit to the test hash value h'(x, M) to verify whether the message M has been altered.

6. The method of claim 1, the encrypting step comprising the following steps:

storing the number x;

generating a new number x' based on the old number x; and using the new number x' for encrypting a next message.

7. A computer-implemented method for encrypting a message M into ciphertext C wherein:

n is a number in the form of $n=p_1 p_2$, where $p_1$ and $p_2$ are prime numbers;

$p_1=r_1\ q_1+1$ and $p_2=r_2\ q_2+1$, where $r_1$ and $r_2$ are random numbers and $q_1$ and $q_2$ are prime numbers; and g is a number in the form of $g=r_3^{(p_1-1)(p_2-1)/(q_1 q_3)}$ mod n, where $r_3$ is a random number selected independent of the random numbers $r_1$, and $r_2$;

the computer-implemented method comprising the following steps:

computing a number $x=g^R$ mod n, where R is a random number selected independent of the random numbers $r_1$, $r_2$, and $r_3$;

transforming the number x according to a one-way function h to yield a value h(x); and encoding the message M according to a function of the value h(x).

8. The method of claim 7, the encoding step comprising the step of computing $h(x)\oplus M$.

9. The method of claim 7, further comprising the step of computing a hash value h(x, M) from a hash function h of the number x and the message M.

10. The method of claim 7, further comprising the following steps:
   storing the number x;
   generating a new number x' based on the old number x; and
   using the new number x' for encrypting a next message.

11. A computer-implemented method for decrypting ciphertext C to reproduce a message M, wherein:
   n is a number in the form $n=p_1 p_2$, where $p_1$ and $p_2$ are prime numbers;
   $p_1=r_1 q_1+1$ and $p_2=r_2 q_2+1$, where $r_1$ and $r_2$ are random numbers and $q_1$ and $q_2$ are prime numbers;
   g is a number in the form of $g=r_3^{(p_1-1)(p_2-1)/(q_1 q_2)} \bmod n$, where $r_3$ is a random number selected independent of the random numbers $r_1$ and $r_2$;
   x is a number in the form of $x=g^R \bmod n$, where R is a random number selected independent of the random numbers $r_1$, $r_2$, and $r_3$;
   e is an integer; and
   V is a value in the form of $V=x^e$;
   the computer-implemented method comprising the following steps:
      recovering the number x from the value V, where $x=V^{(1/e) \bmod q_1 q_2} \bmod n$;
      transforming the number x according to a one-way function h to yield a value h(x); and
      decoding the ciphertext C according to a function of the value h(x) to recapture the message M.

12. The method of claim 11, the decoding step comprising the step of computing C⊕h(x).

13. The method of claim 11, further comprising the step of computing a hash value h(x, M) from a hash function h of the number x and the recaptured message M.

14. In a system for sending messages over a network between first and second computing units, a method comprising the following steps:
   (a) encrypting a message M into ciphertext C at the first computing unit, where the ciphertext C includes a value V and a value W, as follows:
      (1) the value V is a function of a number x, $V=x^e$, where e is an integer selected from the first b odd primes, and x is as follows:
         $x=g^R \bmod n$, where:
            (i) n is a number $n=p_1 p_2$ where $p_1$ and $p_2$ are prime numbers with $p_1=r_1 q_1+1$ and $p_2=r_2 q_2+1$, where $q_1$ and $q_2$ are prime numbers and $r_1$ and $r_2$ are random numbers that are not divisible by the first b odd primes;
            (ii) R is a random number selected independent of the random numbers $r_1$ and $r_2$; and
            (iii) g is a number in the form of $g=r_3^{(p_1-1)(p_2-1)/(q_1 q_2)} \bmod n$, where $r_3$ is a random number selected independent of the random numbers $r_1$, $r_2$, and R;
      (2) the value W is a function of a value h(x) and the message M, the value b(x) being a result of a one-way function of the number x;
   (b) sending the ciphertext C from the first computing unit to the second computing unit; and
   (c) decrypting the ciphertext C at the second computing unit to reproduce the message M, where M is a function of the value W and the value h(x) and x is derived as $x=V^{(1/e) \bmod q_1 q_2} \bmod n$.

15. A system for sending messages over a communications channel, comprising:
   an encoder to transform a message M into ciphertext C and transmit the ciphertext C over the communications channel, where the ciphertext C includes a value V and a value W, as follows:
      (1) the value V is a function of a number x, $V=x^e$, where e is an integer and x is as follows:
         $x=g^R \bmod n$, where:
            (i) n is a number n $p_1 p_2$ where $p_1$ and $p_2$ are prime numbers with $p_1=r_1 q_1+1$ and $p_2=r_2 q_2+1$, where $r_1$ and $r_2$ are random numbers, and $q_1$ and $q_2$ are prime numbers;
            (ii) R is a random number selected independent of the random numbers $r_1$ and $r_2$; and
            (iii) g is a number in the form of $g=r_3^{(p_1-1)(p_2-1)/(q_1 q_2)} \bmod n$, where $r_3$ is a random number selected independent of the random numbers $r_1$, $r_2$, and R;
      (2) the value W is a function of a value h(x) and the message M, the value h(x) being a result of a one-way function of the number x; and
   a decoder coupled to receive the ciphertext C and the value V from the communications channel and to transform the ciphertext C back to the message M, where M is a function of the value W and the value h(x) and x is derived as $x=V^{(1/e) \bmod q_1 q_2} \bmod n$.

16. The system of claim 15, the encoder deriving the value W as W=h(x)⊕M.

17. The system of claim 16, the decoder deriving the message M as M=W⊕h(x).

18. The system of claim 15, the integer e equaling 2.

19. The system of claim 15:
   the encoder computing a hash value h(x, M) from a hash function h of the number x and the message M and transmits the hash value h(x, M) along with the ciphertext C; and
   the decoder computing a test hash value h'(x, M) from the hash function h of the derived number x and the reproduced message M and compares the hash value h(x, M) received from the first computing unit to the test hash value h'(x, M) to verify whether the message M has been altered.

20. The system of claim 15, the encoder storing the number x, generating a new number x' based on the old number x, and using the new number x' to compute the values V and W.

21. An encoder for a cryptographic system, where:
   n is a number in the form $n=p_1 p_2$, where $p_1$ and $p_2$ are prime numbers;
   $p_1=r_1 q_1+1$ and $p_2=r_2 q_2 30 1$, where $r_1$ and $r_2$ are random numbers and $q_1$ and $q_2$ are prime numbers; and
   g is a number in the form of $g=r_3^{(p_1-1)(p_2-1)/(q_1 q_2)} \bmod n$, where $r_3$ is a random number selected independent of the random numbers $r_1$ and $r_2$;
   the encoder comprising:
      means for computing a number $x=g^R \bmod n$, where R is a random number selected independent of the random numbers $r_1$, $r_2$, and $r_3$;
      means for transforming the number x according to a one-way function h to yield a value h(x); and
      means for encoding a message M according to a function of the value h(x).

22. The encoder of claim 21, the encoding means encoding the message M according to the function h(x)⊕M.

23. The encoder of claim 21, further comprising:

means for storing the number x;

means for generating a new number x' based on the old number x; and means for using the new number x' to derive the value h(x).

24. A decoder for a cryptographic system, where:

n is a number in the form $n=p_1 p_2$, where $p_1$ and $p_2$ are prime numbers;

$p_1=r_1 q_1+1$ and $p_2=r_2 q_2+1$, where $r_1$ and $r_2$ are random numbers and $q_1$ and $q_2$ are prime numbers;

g is a number in the form of $g=r_3^{(p_1-1)(p_2-1)/(q_1 q_2)}$ mod n, where $r_3$ is a random number selected independent of the random numbers $r_1$ and $r_2$;

x is a number in the form of $x=g^R$ mod n, where R is a random number selected independent of the random numbers $r_1$, $r_2$, and $r_3$;

e is an integer;

V is a value in the form of $V=x^e$; and

W is a value derived from a function of a message M and a value h(x), where h(x) is a result of a one-way function h;

the decoder comprising:
   means for receiving the values V and W;
   means for recovering the number x from the value V, where $x=V^{(1/e) \bmod q_1q_2}$ mod n;
   means for transforming the number x according to a one-way function h to yield the value h(x); and
   means for decoding the value W according to a function of the value h(x) to recapture the message M.

25. The decoder of claim 24, the decoding means computing the function W⊕h(x) to recapture the message M.

26. The decoder of claim 24, further comprising means for computing a hash value h(x, M) from a hash function h of the number x and the recaptured message M.

27. A system for sending messages over a communications channel, comprising:

an encoder to transform a message M into ciphertext C and transmit the ciphertext C over the communications channel, where the ciphertext C includes a value V and a value W, as follows:
   (1) the value V is a function of a number x, $V=x^e$, where e is an integer selected from the first b odd primes, and x is as follows:
      $x=g^R$ mod n, where:
         (i) n is a number $n=p_1 p_2$ where $p_1$ and $p_2$ are prime numbers with $p_1=r_1 q_1+1$ and $p_2=r_2 q_2+1$, where $q_1$ and $q_2$ are prime numbers and $r_1$ and $r_2$ are random numbers that are not divisible by the first b odd primes;
         (ii) R is a random number selected independent of the random numbers $r_1$ and $r_2$; and
         (iii) g is a number in the form of $g=r_3^{(p_1-1)(p_2-1)/(q_1 q_2)}$ mod n, mod n, where $r_3$ is a random number selected independent of the random numbers $r_1$, $r_2$, and R;
   (2) the value W is a function of a value h(x) and the message M, the value h(x) being a result of a one-way function of the number x;

a decoder coupled to receive the ciphertext C and the value V from the communications channel and to transform the ciphertext C back to the message M, where M is a function of the value W and the value h(x) and x is derived as $x=V^{(1/e)}$ mod $q_1q_2$ mod n.

28. A computer-readable medium having computer-executable instructions causing a computer to encrypt a message M to a ciphertext C, where:

n is a number in the form $n=p_1 p_2$, where $p_1$ and $p_2$ are prime numbers;

$p_1=r_1 q_1+1$ and $p_2=r_2 q_2+1$, where $r_1$ and $r_2$ are random numbers and $q_1$ and $q_2$ are prime numbers; and g is a number in the form of $g=r_3^{(p_1-1)(p_2-1)/(q_1 q_2)}$ mod n, where $r_3$ is a random number selected independent of the random numbers $r_1$ and $r_2$;

the computer-readable medium comprising:
   computer-executable instructions which cause a computer to compute a number $x=g^R$ mod n, where R is a random number selected independent of the random numbers $r_1$, $r_2$, and $r_3$;
   computer-executable instructions which cause a computer to transform the number x according to a one-way function h to yield a value h(x); and
   computer-executable instructions which cause a computer to encode a message M according to a function of the value h(x).

29. The computer-readable medium of claim 28, further comprising computer-executable instructions which cause a computer to encode the message M according to the function h(x)⊕M.

30. The computer-readable medium of claim 28, further comprising computer-executable instructions which cause a computer to store the number x, generate a new number x' based on the old number x, and use the new number x' to derive the value h(x).

31. A computer-readable medium having computer-executable instructions causing a computer to decrypt ciphertext C to recover a message M, where:

n is a number in the form $n=p_1 p_2$, where $p_1$ and $p_2$ are prime numbers;

$p_1=r_1 q_1+1$ and $p_2=r_2 q_2+1$, where $r_1$ and $r_2$ are random numbers and $q_1$ and $q_2$ are prime numbers;

g is a number in the form of $g=r_3^{(p_1-1)(p_2-1)/(q_1 q_2)}$ mod n, where $r_3$ is a random number selected independent of the random numbers $r_1$ and $r_2$;

x is a number in the form of $x=g^R$ mod n, where R is a random number selected independent of the random numbers $r_1$, $r_2$, and $r_3$;

e is an integer; and

V is a value in the form of $V=x^e$;

the computer-readable medium comprising:
   computer-executable instructions which cause a computer to recover the number x from the value V, where $x=V^{(1/e) \bmod q_1q_2}$ mod n;
   computer-executable instructions which cause a computer to transform the number x according to a one-way function h to yield h(x); and
   computer-executable instructions which cause a computer to decode the ciphertext C according to a function of h(x) to recapture the message M.

32. The computer-readable medium of claim 31, further comprising computer-executable instructions which cause a computer to decode the ciphertext C according to the function C⊕h(x).

33. The computer-readable medium of claim 31, further comprising computer-executable instructions which cause a computer to compute a hash value h(x, M) from a hash function h of the number x and the recaptured message M.

* * * * *

UNITED STATES PATENT AND TRADEMARK OFFICE
CERTIFICATE OF CORRECTION

PATENT NO. : 6,081,598
DATED : June 27, 2000
INVENTOR(S) : Wei Dai

It is certified that error appears in the above-identified patent and that said Letters Patent is hereby corrected as shown below:

Column 9,
Line 28, change "$x = V^{(1/e) \mod q_1 q_2}$" to -- $x = V^{(1/e) \mod q_1 q_2}$ --
Line 60, change "b(x)" to -- h(x) --.

Column 10,
Line 52, change "$p_2 = r_2 q_2^{30}\ 1$" to -- $p_2 = r_2 q_2 + 1$ --

Signed and Sealed this

Eighteenth Day of March, 2003

JAMES E. ROGAN
*Director of the United States Patent and Trademark Office*